United States Patent [19]

Hojo et al.

[11] 3,771,085
[45] Nov. 6, 1973

[54] DEVIATION DETECTING APPARATUS

[75] Inventors: Takeshi Hojo, Fujisawa-shi; Shin-Ichi Kawada, Yokohama-shi, both of Japan

[73] Assignee: Kabushikikaisha Tokyo Keiki (Tokyo Keiki Co., Ltd.), Tokyo, Japan

[22] Filed: Aug. 2, 1972

[21] Appl. No.: 277,399

[30] Foreign Application Priority Data
Aug. 10, 1971 Japan............................ 46/60499
Aug. 10, 1971 Japan............................ 46/60497

[52] U.S. Cl.................. 336/182, 336/121, 336/122, 336/126
[51] Int. Cl......................... H01f 27/28, H01f 21/04
[58] Field of Search.................... 336/115, 116, 121, 336/122, 123, 124, 125, 126, 30, 180, 182

[56] References Cited
UNITED STATES PATENTS

| 2,458,700 | 1/1949 | Greenough | 336/122 X |
|---|---|---|---|
| 2,455,672 | 12/1948 | Greenough | 336/125 |
| 2,282,060 | 5/1942 | James et al. | 336/125 |
| 2,271,517 | 2/1942 | Cockerell | 336/125 X |
| 1,556,612 | 10/1925 | Kloneck | 336/123 X |
| 2,174,017 | 9/1939 | Sullinger et al. | 336/125 X |
| 1,426,137 | 8/1922 | Wright | 336/125 X |
| 2,373,206 | 4/1945 | Thomas | 336/123 X |

Primary Examiner—Thomas J. Kozma
Attorney—Benjamin H. Sherman et al.

[57] ABSTRACT

A deviation detecting apparatus having a primary coil for generating an alternating magnetic field, and a secondary voltage inducing device disposed to oppose said primary coil with a space therebetween and producing a secondary voltage in accordance with the alternating magnetic field caused by said primary coil. In this case, said secondary voltage inducing device consists of four secondary coils, said four secondary coils being arranged in square and made up by winding two electrically insulated wires in parallel, the two first wires of the adjacent two secondary coils being connected to deliver as an output a sum or difference of induced voltages therein and to form two pairs of winding groups each of said two pairs of winding groups being connected to deliver as an output a sum or difference of induced voltages therein, the two adjacent second wires being connected to deliver as an output a sum or difference of induced voltages therein and to form two pairs of winding groups in a different manner to that in said first wires, said pairs of winding groups being connected in such a manner that a sum or difference of induced voltages therein is delivered as an output.

2 Claims, 13 Drawing Figures

DEVIATION DETECTING APPARATUS

BACKGROUND OF THE INVENTION

1. Field of the Invention

The invention relates to a deviation detecting apparatus which converts a mechanical displacement or deviation into a corresponding electrical signal with, for example, a differential transformer.

2. Description of the Prior Art

A conventional deviation detecting apparatus has the drawback that it is low in detecting accuracy.

SUMMARY OF THE INVENTION

It is an object of the invention to provide a deviation or displacement detecting apparatus free from the drawback encountered in the prior art.

It is another object of the invention to provide a deviation or displacement detecting apparatus which detects a deviation positively and accurately.

DESCRIPTION OF THE PREFERRED EMBODIMENTS

Figure 1:
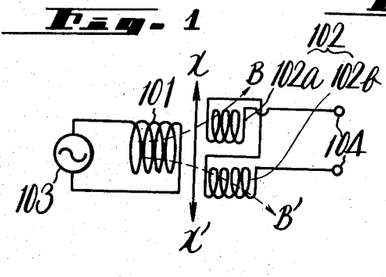
FIG. 1 is a schematic diagram showing a deviation detecting apparatus of the prior art.

In order to better understand the invention, a conventional deviation detecting apparatus consisting of a differential transformer will be now described with reference to FIG. 1. In the figure reference numeral 101 designates a primary coil of a differential transformer which generates alternating magnetic fields or fluxes B and B' in a space when excited with an AC power source 103. The differential transformer has a secondary coil assembly 102 which consists of two secondary coils 102a and 102b, the secondary coils 102a and 102b being connected with each other differentially or in a differential manner. When the secondary coil assembly 102 is positioned with respect to the primary coil 101, the magnetic fluxes B and B' generated by the primary coil 101 pass through the secondary coils 102a and 102b equally. Accordingly, voltages induced in the secondary coils 102a and 102b by the magnetic fluxes B and B' are equal in magnitude and direction. In this case, the secondary coils 102a and 102b are connected differentially, so that there is produced no voltage at an output terminal 104 of the secondary coil assembly 102. However, if the secondary coil assembly 102 is moved to the x-direction in the figure with respect to the primary coil 101 which is assumed to be fixed, the magnetic flux passing through the secondary coil 102a increases as compared with that passing through the secondary coil 102b with the result that there is derived at the output terminal 104 a voltage which corresponds in magnitude to the moving distance or displacement of the secondary coil assembly 102 relative to the primary coil 101. If the secondary coil assembly 102 moves to the counter direction, namely to the x'-direction in the figure with respect to the primary coil 101, there is derived at the output terminal 104 a voltage which corresponds in magnitude to the moving distance of the secondary coil assembly 102 relative to the primary coil 101 and is reversed in phase, namely is shifted in phase by 180° with that of the former. In this case, there may be provided an iron core or ferromagnetic core for enhancing the magnetic flux.

Figure 2A:
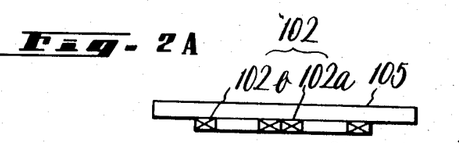
FIG. 2A is a side view of its secondary coil.
Figure 2B:
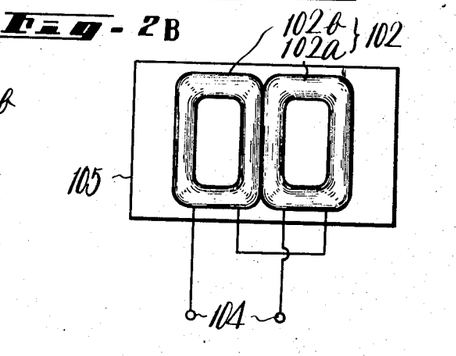
FIG. 2B is a plane view of the secondary coil depicted in FIG. 2A.

FIGS. 2A and 2B show the case where the secondary coil assembly 102 consisting of two coils 102a and 102b is fixedly mounted on a base plate 105 made of insulating material with a bonding agent or the like.

Figure 3A:
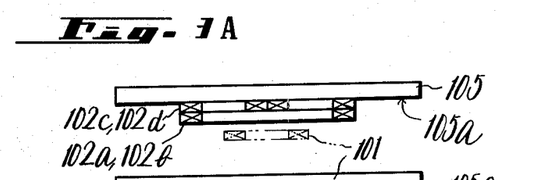
FIG. 3A is a side view of a secondary coil of a deviation detecting apparatus of another conventional apparatus.
Figure 3B:
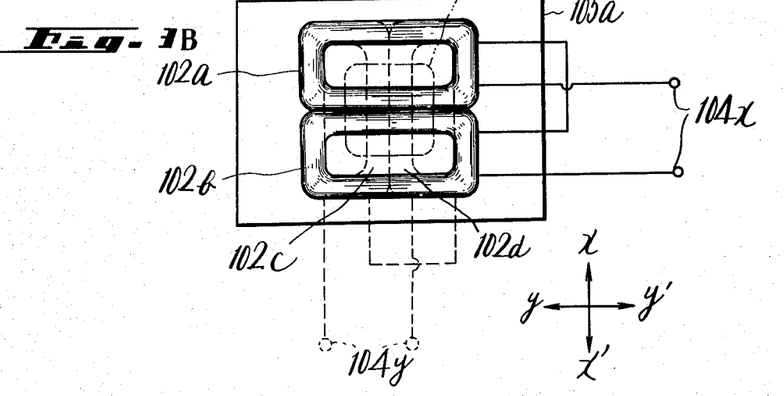
FIG. 3B is its plane view.

FIGS. 3A and 3B show the case where the secondary coil assembly 102 made of secondary coils 102a, 102b, 102c and 102d mounted on the base plate 105 on its one surface 105a. The deviation detecting apparatus consisting of the secondary coil assembly 102 and the primary coil 101 shown in FIGS. 3A and 3B may detect movement of, for example, the secondary coil assembly 102 with respect to the primary coil 101 in x-, x'-, y- and y'- directions.

In the example of FIGS. 3A and 3B, the primary coil 101 is wound in substantially square-shape and excited by AC current. One pair of the secondary coils 102c and 102d are mounted on the other pair of the secondary coils 102a and 102b with a rotation angle of 90° with respect to the latter. The coils of the two pairs are connected differentially or in a differential manner, so that at an output terminal 104x of the coils 102a and 102b there is delivered a voltage corresponding to the moving distance thereof in the x–x' direction relative to the primary coil 101 and at an output terminal 104y of the coils 102c and 102d there is delivered a voltage corresponding to the moving distance thereof in the y–y' direction relative to the primary coil 101. In this case, if each of the coils is wound rectangular and the area of the primary coil 101 is selected smaller than those of the two secondary coils, the interference therebetween can be prevented.

With the conventional deviation detecting apparatus described above, there is the drawback that the difference in gap between the primary coil 101 and the secondary coils 102a and 102b and in gap between the primary coil 101 and the secondary coils 102c and 102d because of the thickness of the coils results in the different output voltage for per unit moving distance between the x–x' and y–y' directions. That is, in the case of the example shown in FIGS. 3A and 3B, since the secondary coils 102c and 102d are positioned with more distance with respect to the primary coil 101 than that of the secondary coils 102a and 102b with respect to the primary coil 101, the pickup gain, namely the output voltage per unit displacement in $y-y'$ direction is smaller than that in $x-x'$ direction.

Figure 4:
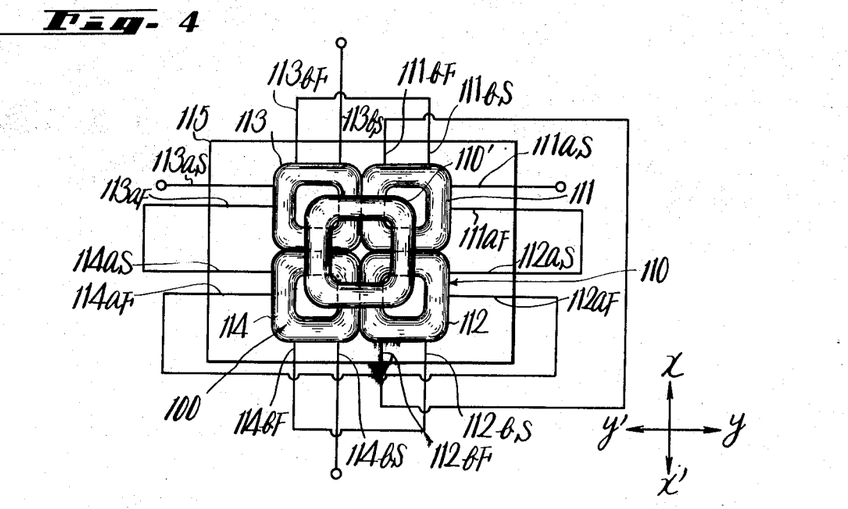
FIG. 4 is a plane view of a deviation detecting apparatus according to the invention.

A description will be now given on an embodiment of the deviation detecting apparatus of the invention, which is free from the drawback encountered in the prior art, with reference to FIG. 4. In the invention shown in FIG. 4, a deviation detecting apparatus referred at 100 generally is made in a differential transformer which consists of a primary coil 110' and a secondary coil assembly 110. The secondary coil assembly 110 consists of, for example, four coils 111, 112, 113 and 114 each of which is wound in square. All the secondary coils 111 to 114 are mounted on a base plate 115 made of insulating material in such a manner that they are substantailly in the same plane and form a square as a whole, as shown in FIG. 4. In this case, the respective secondary coils 111 to 114 are made with two windings electrically insulated with each other. In FIG. 4, the first winding for forming each secondary coil is shown by references with the corresponding reference numerals with $a$, the second winding for forming each secondary coil is shown by references with the corresponding reference numerals with $b$ and the starting and terminating ends of the respective windings are shown by reference with the corresponding numerals with $s$ and F, respectively. Accordingly, sixteen wires 111$as$, 111$a$F, 111$bs$, 111$b$F, ... 114$bs$, and 114 $b$F are led out from the secondary coils 111 to 114, as shown in FIG. 4. In the example of FIG. 4, the first windings, namely those referred at references with a suffix $a$ are used for detecting the deviation or displacement in the $y-y'$ direction, while the second windings, namely those referred at references with a suffix $b$ are employed for detecting the deviation or displacment in the $x-x'$ direction. If the first windings for secondary coils 111$a$ and 112$a$, and those for the secondary coils 113$a$ and 114$a$ are connected with one another to produce a sum output, they correspond to the secondary coils 112$d$ and 112$c$ in FIG. 3. Therefore, if they are further connected differentially or in a differential manner, a voltage corresponding to the moving distance in the $y-y'$ direction may be obtained across the wires 111$as$ and 113$as$. Meanwhile, if the second windings for the secondary coils 111$b$ and 113$b$ and those for the secondary coils 112 $b$ and 114$b$ are connected with one another to produce an sum voltage, they correspond to the secondary coils 112$a$ and 112$b$. Therefore, if they are further connected differentially, a voltage corresponding to the moving distance in the $x-x'$ direction may be obtained across the wires 113$bs$ and 114$bs$.

As apparent from the foregoing description, it will be clear that the diviation detecting apparatus of the invention can detect the moving distances in both the $y-y'$ and $x-x'$ directions.

Further, in the invention the first and second windings are made up by two elementary wires electrically insulated with each other, so that the gaps between the primary coil and the secondary coils are same in length and the pickup gain in $x-x'$ and $y-y'$ directions is stricly same. Accordingly, it will be apparent that the deviation detecting apparatus of the invention can detect the moving distance or deviation in two mutually perpendicular directions positively and accurately.

A description will now be given on a gyrocompass in which the deviation detecting device according to the invention, as described above, is employed as a non-contact type deviation detecting apparatus or a pickup for following-up, with reference to FIG. 5.

Figure 5:
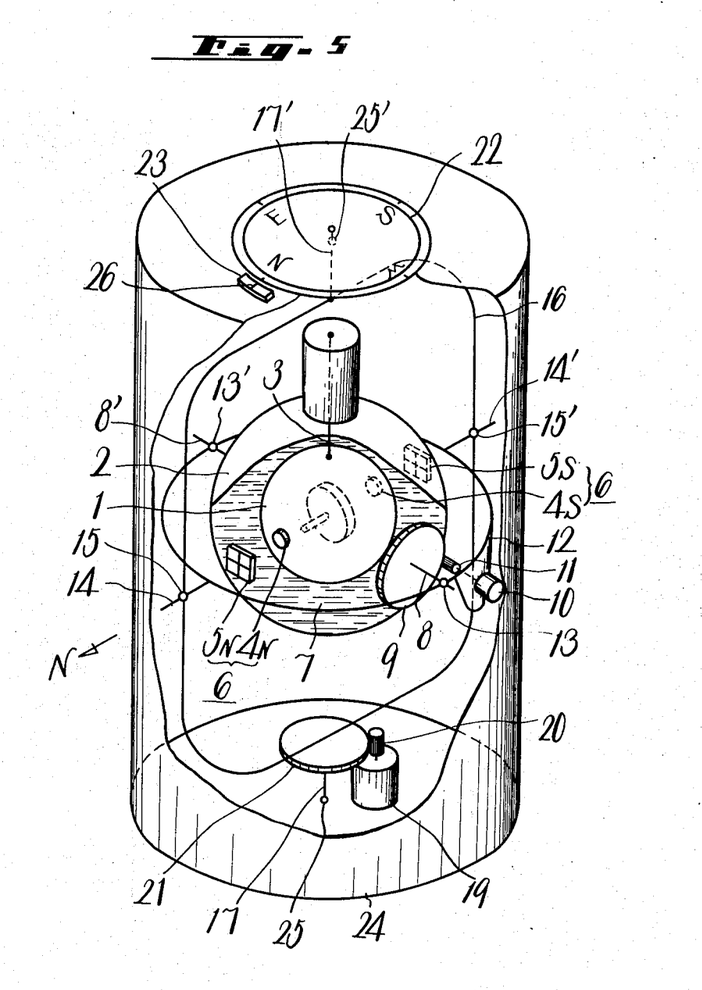
FIG. 5 is a perspective view, partialy cut away, of a gyrocompass equipped with a deviation detecting apparatus of the invention.

In FIG. 5, reference numeral 1 indicates a gyro case housing therein a gyro rotor rotating at high speed, which case is formed in a liquid-tight manner. Reference numeral 2 designates a container such as a tank which contains the gyro case 1, and 3 a suspension wire for supporting the gyro case 1, which wire is fixed at the upper end to the tank 2 and at the lower end to the gyro case 1 respectively. Reference numerals 4N, 4S and 5N, 5S identify primary and secondary sides or members of a non-contact deviation detecting device 6 respectively. The members 4N, 5N and 4S, 5S correspond to the primary coil 110' and the secondary coil assembly 110 of the apparatus 100 of the invention. The primary sides 4N and 4S are positioned on, for example, the surface of the gyro case 1 at the intersection of the surface of the gyro case 1 with the extensions of the spin axis of the gyro, that is, on the north and south sides of the gyro, while the secondary sides 5N and 5S are disposed on the tank 2 in alignment with the primary sides 4N and 4S. Reference numeral 7 denotes a liquid such as a damping oil of high viscosity, for example, a silicon oil which is contained in the tank 2. A pair of horizontal shafts 8 and 8' are attached at their one ends to the tank 2 on the equator thereof at positions perpendicular to the spin axis of the gyro and are rotatably fitted at the other ends into bearings 13 and 13' which are disposed on a horizontal ring 12 in alignment with the horizontal shafts 8 and 8'. Reference numeral 10 represents a servo motor for horizontal follow-up, which is attached to the horizontal ring 12. A horizontal gear 9 is mounted about the one of the horizontal shafts, for example, shaft 8 and is meshed with a horizontal pinion 11 attached to the rotary shaft of the servo motor 10. Gimbal shafts 14 and 14' are attached to the horizontal ring 12 at positions perpendicular to the aforesaid horizontal shaft bearings 13 and 13' and these gimbal shafts 14 and 14' are rotatably supported by gimbal bearings 15 and 15' provided on a follow-up ring 16 in alignment with the shafts 14 and 14' respectively. Follow-up shafts 17 and 17' are secured at one ends thereof to the bottom and top of the follow-up ring 16 and their free ends are rotatably inserted into follow-up shaft bearings 25 and 25' disposed on a binnacle 24 at positions corresponding thereto respectively. An azimuth gear 21 is mounted about the one of the follow-up shafts, namely, the shaft 17 in the example. Reference numeral 19 designates an azimuth follow-up servo motor attached to the binnacle 24 and 20 an azimuth pinion affixed to the rotary shaft of the servo motor 19, which pinion meshes with the azimuth gear 21. Reference numeral 22 indicates a compass card secured to the follow-up shaft 17'. Reference numeral 23 represents a reference line plate disposed on the top of the binnacle 24 in association with the compass card 22. The course of the ship equipped with the gyrocompass is read out from the combination of a reference line 26 drawn on the plate 23 centrally thereof and the compass card 22.

Figure 6:
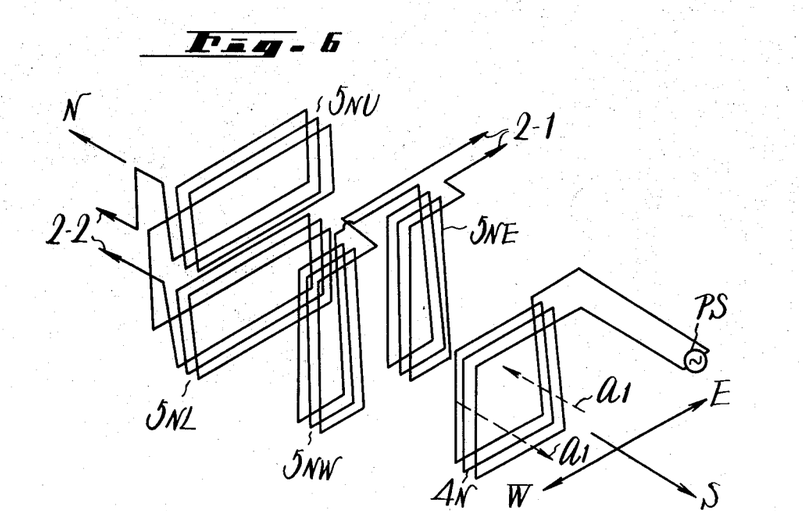
FIGS. 6, 7 and 8 are schematic diagrams for explaining a deviation detecting apparatus of the invention used in the gyrocompass and a follow-up system employed therein.
Figure 7:
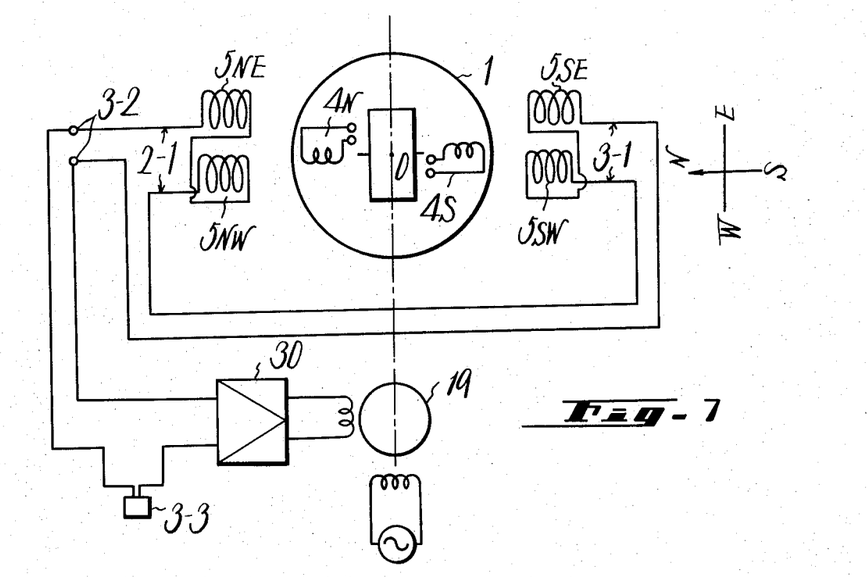

Referring now to FIGS. 6, and 7, a description will be given of one concrete example of the aforementioned non-contact deviation detecting device 6 or 100. It should be noted that each of the secondary coils are practically made by two wires wound together to be four coils as shown in FIG. 4, but for the sake of brevity those shown in FIG. 3 are employed in the following.

FIG. 6 shows the pair of N (north) sides thereof. As shown in the figure, the primary side 4N is a coil and its winding lies in a plane perpendicular to the spin axis of the gyro and this coil is usually excited by AC current from a gyro power source PS, establishing alternating magnetic fields indicated by broken arrows $a_1$ and $a_1'$. The secondary side 5N is made up of four rectangular coils 5NW, 5NE, 5NU and 5NL and the one pair of coils 5NW and 5NE are disposed side by side and the other pair of coils 5NL and 5NU are disposed one above the other. The winding starting ends of the pair of coils 5NW and 5NE and those of the other pair of coils 5NU and 5NL are interconnected. Assuming that the primary side coil 4N, that is, the gyro case 1 lies at the center of the secondary side coil 5N, that is, the tank 2, a magnetic flux produced by the primary coil 4N passes through the secondary coils 5NW, 5NE, 5NU and 5NL to induce a corresponding voltage in each of them. However, the magnetic flux in each secondary coil is substantially equal to that in the other coils and the respective pairs of coils are connected in a differential manner as described above, so that no voltage is derived at their output terminals 2-1 and 2-2. Assuming that the primary coil 4N is displaced eastward (indicated by E in the figure), the magnetic flux passing through the coil 5NE increases while that passing through the coil 5NW decreases, so that a voltage is derived at the output terminal 2-1 but no output is derived at the terminal 2—2. While, when the primary coil 4N is displaced westward (indicated by W in the figure), the induced voltage of the coil 5NW increases, while that of the coil 5NE decreases, deriving at the output terminal 2-1 a voltage opposite in phase to that obtained when the primary coil 4N is displaced eastward. In this case, since the coils 5NU and 5NL are arranged in a vertical direction, no voltage is produced at the output terminal 2—2 as in the above case. While, in response to the vertical displacement of the primary coil 4N, equal voltage is induced in the coils 5NW and 5NE arranged side by side, but an unequal voltage is induced in the coils 5NL and 5NU disposed in the vertical direction, so that an output voltage is provided at the output terminal 2—2. Namely, with the construction shown in FIG. 6, it is possible to detect the displacement of the gyro case 1 in the east-west direction and in the vertical direction relative to the tank 2 on the north end.

FIG. 7 illustrates a device for detecting the displacement of the gyro case in the east-west direction only, with the gyro case 1 being viewed from above. Namely, the non-contact deviation detecting device on the south side is made up of the primary side coil 4S and secondary side coils 5SE and 5SW. When the gyro case 1 is displaced eastward, the magnetic flux passing through the coil 5SE increases and that passing through the coil 5SW decreases to induce a voltage between terminals 3-1 and the phase of the voltage is the same as that of the voltage induced between the terminals 2-1 of the coils 5NW and 5NE. Further, since the coils 5SE, 5SW and 5NE, 5NW are interconnected in a differential manner as depicted in FIG. 7, no voltage is produced between the output terminals 3-2 in response to the displacement of the gyro case 1 in the east-west direction but when the gyro case 1 turns about a vertical axis 0 (normal to the sheet of the drawing) an output voltage reversed 180° in phase is produced between the terminals 3-2 in accordance with the turning direction of the gyro case 1. This output voltage is applied to a control winding of the azimuth servo motor 19 through a servo amplifier 30 (which may be omitted). The revolution of the servo motor 19 is transmitted to the tank 2 through the azimuth pinion 20, the azimuth gear 21, the follow-up ring 16 and the horizontal ring 12 to control the tank 2 in such a manner as to reduce the angular deviation between the tank 2 and the gyro case 1 about the aforesaid vertical axis 0 to be zero. Namely, in whatever azimuth the gyro case 1 may lie, the suspension wire 3 is completely prevented by the servo system from twisting and any external distrubance torque is impressed from the suspension wire 3 to the gyro about the vertical axis. In FIG. 7, reference numeral 3—3 indicates an error correcting signal generator, which produces a voltage corresponding to the speed or latitude of the ship to make the corresponding angular offset in the follow-up system, by which the suspension wire 3 is twisted to apply torque to the gyro about its vertical axis, thus correcting an error.

Figure 8:
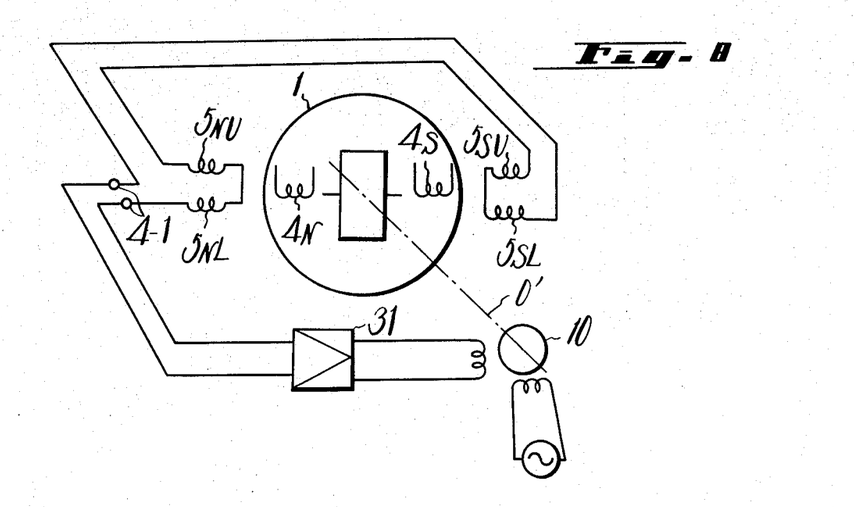

FIG. 8 illustrates a horizontal follow-up system, in which the coils 5NU, 5NL and 5SU, 5SL of the secondary sides 5N and 5S are also interconnected in a differential manner as in the former case, so that no output voltage is produced between terminals 4-1 of the coils 5NU and 5NL in response to the vertical movement of the gyro case 1 relative to the tank 2 but a voltage is derived between the terminals 4-1 in response to the angular movement of the gyro case 1 about a horizontal axis 0' and the voltage produced is applied directly or through a servo amplifier 31 to a control winding of the horizontal follow-up servo motor 10. The rotation of the horizontal follow-up servo motor 10 is transmitted through the horizontal pinion 11 and the horizontal gear 9 to the tank 2 to turn it, reducing its angular deviation between the tank 2 and the gyro case 1 to be zero.

Figure 9:
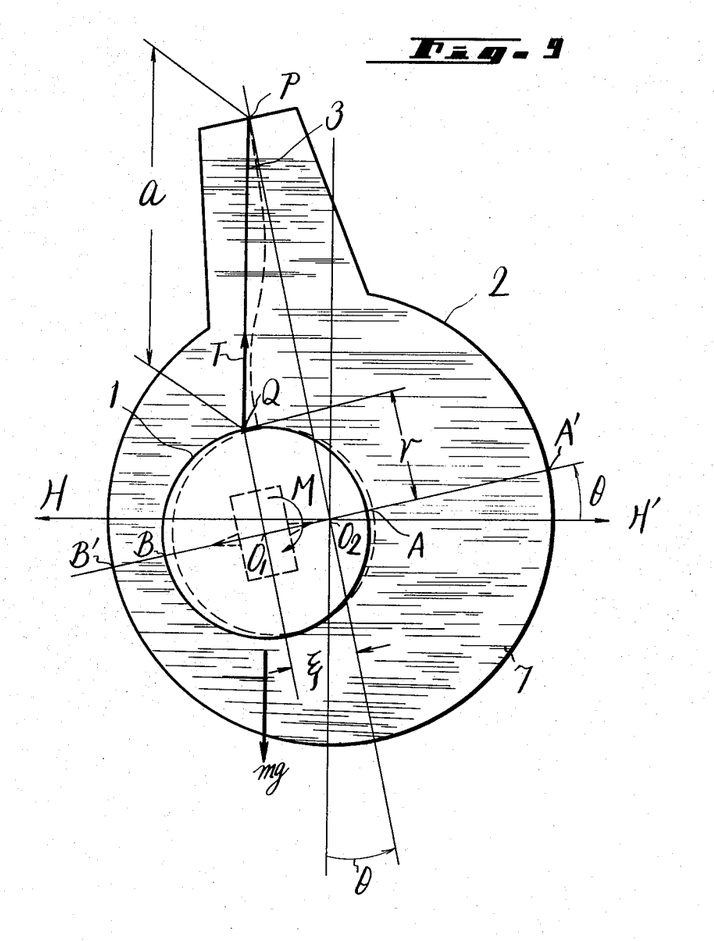
FIG. 9 is a schematic diagram showing a tank used in the gyrocompass.

FIG. 9 schematically shows the inside of the tank 2 in the case where the north-seeking end A (lying on the gyro case 1) of the extension of the spin axis of the gyro in the gyro case 1 is inclined up at an angle $\theta$ to a horizontal plane H–H'. In the figure, reference character $O_1$ indicates the center of gravity of the gyro case 1, Q the coupling point of the suspension wire 3 with the gyro case 1, P the coupling point of the suspension wire 3 with the tank 2, and $O_2$ the center of the tank 2. Assume that the spin axis of the gyro rotor in the gyro case 1 is horizontal ($\theta=0$), $O_1$ and $O_2$ coincides with each other. Reference character A designates the north-seeking end and B a point on the gyro case 1 which is diametrically opposite to the north-seeking end A, and A' and B' points on the tank 2 corresponding to A and B. Since the suspension wire 3 has flexural rigidity in practice, it presents a deflection curve such as indicated by a broken line in the figure. Accordingly, the amount of axial movement $\epsilon$ ($O_2 \sim O_1$) of the gyro case 1 relative to the tank 2 decreases extremely slightly but, in practice, this influence is extremely small, so that the following description will be made on the assumption that the suspension wire 3 is completely flexible. As described previously, the points A' and B' on the tank 2 and those A and B on the gyro case 1 are held in alignment with each other by the operation of the servo system, and consequently the tank 2 is also inclined at the angle $\theta$ to the horizontal plane H–H' as is the case with the gyro case 1. Assuming that no external acceleration exists, no external force acts in the direction of the spin axis of the gyro case 1, so that the suspension wire 3 is aligned with the vertical line. If the tensile force of the suspension wire 3 is taken as T and the residual weight of the gyro case 1 except its buoyancy due to the damper liquid 7 is taken as mg, the tensile force T of the suspension wire 3 provides about the point $O_1$ the following moment M:

$$M = Tr\sin\theta = mg\ r\sin\theta$$

and this moment is applied as torque to the gyro about its horizontal axis (passing through the point $O_1$ and normal to the sheet of the drawing). Here, r represents the distance between the center $O_1$ of gravity of the gyro case 1 and the coupling point Q of the suspension wire 3 with the gyro case 1 as shown in the figure. Namely, also with this method, torque proportional to the inclination of the spin axis to the horizontal plane can be applied to the gyro about its horizontal axis in exactly the same manner as in the case of the conventional gyro compasses, so that a gyrocompass can be obtained by selecting the distance r, the residual mass mg and the angular momentum of the gyro and selecting the period of its north-seeking motion in the range of several tens minutes to one hundred and several tens minutes. In practice, this is equivalent to that the distance r has become a little longer than the practical distance between $O_1$ and Q on account of the flexural rigidity of the suspension wire 3.

A description will be made of a damping device effective when used in the gyrocompass described in connection with FIGS. 5 to 9. The basic principle of the damping device is that torque proportional to the inclination of the spin axis of the gyro from the horizontal plane is applied to the gyro about its vertical axis, which principle has already been utilized in many conventional gyrocompasses. Where the spin axis of the gyrocompass described previously in connection with FIGS. 5 to 9 is inclined at an angle $\theta$ to the horizontal plane H-H', the tank 2 is also inclined by the action of the horizontal follow-up system by the same angle $\theta$ as the gyro in the gyro case 1 and the gyro case 1 moves by $O_2 - O_1 = \epsilon$ in the direction of B' until the suspension wire 3 comes to coincide with the vertical line and then the gyro case 1 stands still. In other words, the inclination angle $\theta$ of the gyro and the amount of movement $\epsilon$ of the gyro case 1 in the direction of the spin axis relative to the tank 2 are completely in proportion to each other. Consequently, a desired damping action can be obtained by electrically detecting the amount of movement $\epsilon$, biasing the following position of the vertical follow-up system in accordance with the detected amount and twisting the suspension wire 3.

Figure 10:
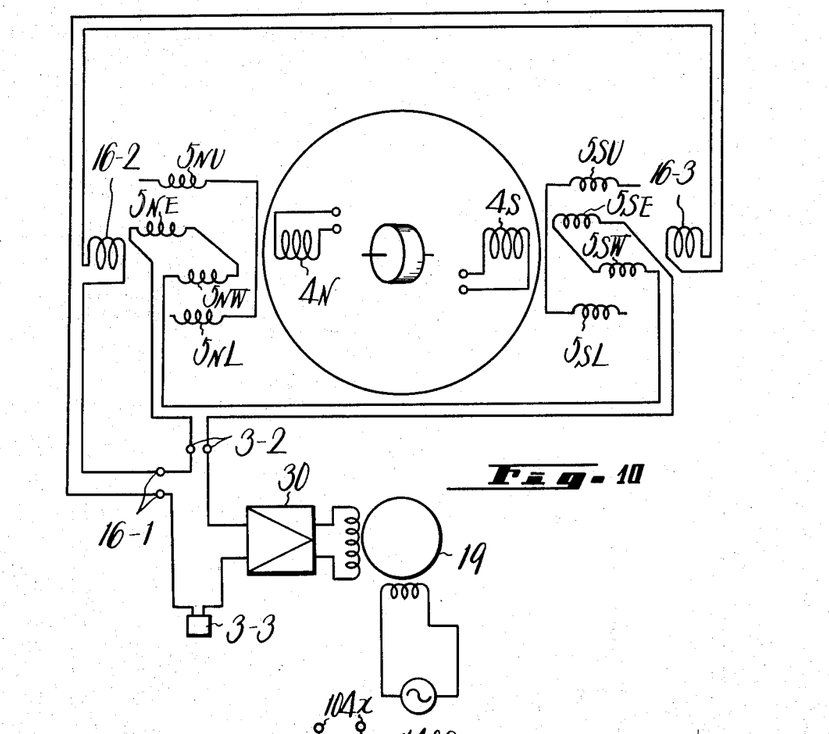
FIG. 10 is a schematic diagram of a damping device equipped with another deviation detecting apparatus of the invention.

FIG. 10 illustrates a concrete embodiment with the above principle being applied to the FIG. 7 example. In the present embodiment, two coils 16-2 and 16-3 are additionally provided on the north and south sides of the secondary side coils 5N and 5S of the non-contact deviation detecting device 6 in such a manner that the faces of the bobbins of the coils 16-2 and 16-3 may lie in parallel with the two pairs of coils 5NE, 5NW and 5SE, 5SW. The coils 16-2 and 16-3 are interconnected in a differential manner and their output ends 16-1 are additively connected to the signal terminals 3-2 of the vertical follow-up system and then connected to the control winding of he azimuth servo motor 19 through the servo amplifier 30. In this case, the vertical follow-up system produces a servo error corresponding to a signal voltage between the terminals 16-1 which is proportional to $\epsilon$, providing an angular offset in azimuth between the tank 2 and the gyro the 1 corresponding to the signal between the terminals 16-1. Accordingly, the suspension wire 3 is twisted in proportion to $\epsilon$ and since this twisting torque is proportional to $\epsilon$, it is proportional to the inclination angle $\theta$ of the gyro spin axis, and consequently it is possible to apply a damping action to the gyro.

Figure 11:
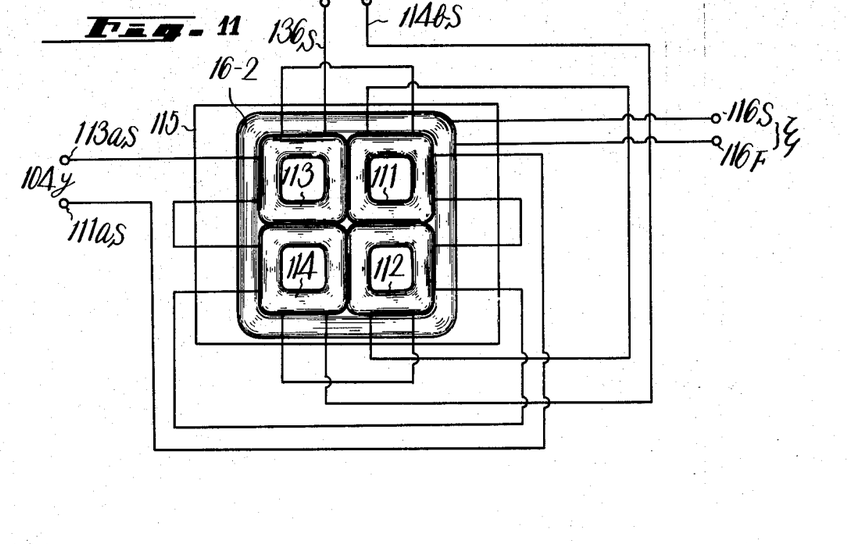
FIG. 11 is a plane view showing another embodiment of the deviation detecting apparatus of the invention.

FIG. 11 shows a practical embodiment of the secondary coil 5N of, for example, the north side of the deviation detecting apparatus shown in FIG. 10. In this embodiment, the coil 16-2 for damping is disposed on the base plate 115 to surround the four coils 111 to 114 which are arranged in square as described with reference to FIG. 4.

According to this embodiment in which two coils 16-2 and 16-3 for damping are provided outside two secondary coils of the deviation detecting apparatus at the south and north positions of the tank, the inclination angle of the spin axis relative to the horizontal plane can be detected without additionally providing any primary coil. Accordingly, it may be understood that the deviation detecting apparatus of the example can be used instead of an expensive accelerometer such as, for example, an electrolyte level or the like.

We claim as our invention:

1. A deviation detecting apparatus comprising a primary coil for generating an alternating magnetic field, and a secondary voltage inducting device disposed to oppose said primary coil with a space therebetween and producing an induced secondary voltage in accordance with the alternating magnetic field caused by said primary coil, characterized in that said secondary voltage inducing device consists of four secondary coils, said four secondary coils being arranged in a plane in the form of a square and each of said four secondary coils being made up by winding two electrically insulated wires in parallel, the two first wires of adjacent two secondary coils of said four secondary coils being connected to deliver an output which is the sum of voltages induced therein and to form two winding groups, said two winding groups being connected to deliver an output which is the difference of voltages induced therein, the two second wires of the other adjacent two secondary coils being connected to deliver an output which is the sum of voltages induced therein and to form two other winding groups, said last mentioned two winding groups being connected to deliver an output which is the difference of voltages induced therein.

2. A deviation detecting apparatus as claimed in claim 1, wherein another coil is provided which surrounds said four secondary coils.

* * * * *